United States Patent [19]

Sugiura

[11] Patent Number: 5,427,467
[45] Date of Patent: Jun. 27, 1995

[54] BALL JOINT APPARATUS AND A MANUFACTURING METHOD THEREFOR

[75] Inventor: Hironobu Sugiura, Yokohama, Japan

[73] Assignee: NHK Spring Co., Ltd., Yokohama, Japan

[21] Appl. No.: 132,140

[22] Filed: Oct. 4, 1993

[30] Foreign Application Priority Data

Oct. 6, 1992 [JP] Japan .................. 4-267518

[51] Int. Cl.$^6$ ........................................ F16C 11/00
[52] U.S. Cl. ..................................... 403/140; 403/133
[58] Field of Search .............. 403/133, 146, 141, 142, 403/143, 273, 279, 282

[56] References Cited

U.S. PATENT DOCUMENTS

| | | | |
|---|---|---|---|
| 1,828,358 | 10/1931 | Chryst | 403/282 |
| 3,068,031 | 12/1962 | Herbenar et al. | 403/133 |
| 3,191,264 | 6/1965 | Underwood et al. | 403/140 |
| 4,679,958 | 7/1987 | Mizusawa et al. | |
| 4,693,628 | 9/1987 | Reak | |
| 4,904,107 | 2/1990 | Fukukawa et al. | 403/140 |
| 4,954,006 | 9/1990 | Suzuki et al. | |
| 5,009,538 | 4/1991 | Shirai et al. | 403/140 |
| 5,044,811 | 9/1991 | Suzuki et al. | |
| 5,163,769 | 11/1992 | Dresselhouse | 403/133 |

FOREIGN PATENT DOCUMENTS

| | | | |
|---|---|---|---|
| 0403107 | 12/1990 | European Pat. Off. | |
| 1012657 | 4/1952 | France | 403/143 |
| 2266064 | 10/1975 | France | 403/141 |
| 0379392 | 7/1990 | France | |
| 0823545 | 12/1951 | Germany | 403/133 |
| 3515303 | 11/1986 | Germany | |
| 3905474 | 4/1990 | Germany | |
| 61-176011 | 11/1986 | Japan | |
| 2-120209 | 9/1990 | Japan | |
| 3-12013 | 3/1991 | Japan | |
| 5-45224 | 6/1993 | Japan | |
| 0910690 | 11/1962 | United Kingdom | 403/282 |

*Primary Examiner*—Thomas E. Denion
*Assistant Examiner*—Mark Sgantzos
*Attorney, Agent, or Firm*—Frishauf, Holtz, Goodman & Woodward

[57] ABSTRACT

A ball joint apparatus comprises a socket formed of a thermoplastic synthetic resin, a stud ball having a spherical head rotatably fitted in the socket so as to mate with a concave spherical surface thereof, and a housing containing the socket. The housing includes a cylindrical socket receiving portion, formed by plastically processing a metal sheet and a bottom wall portion. Through holes are bored through the bottom wall portion. Projections are provided on the base of the socket, corresponding in position to the through holes. The socket is fixed to the housing by inserting the projections into the through holes, softening each end portion of the projections, which projects outside the through holes, by heating or the like and transforming the end portions into a flat shape.

15 Claims, 4 Drawing Sheets

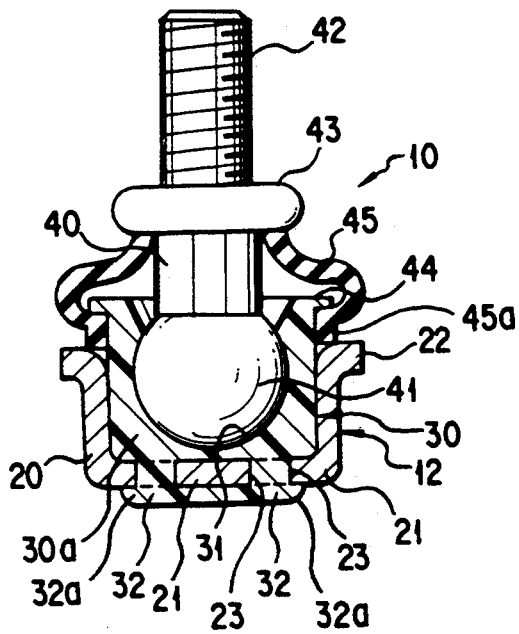
F I G. 6
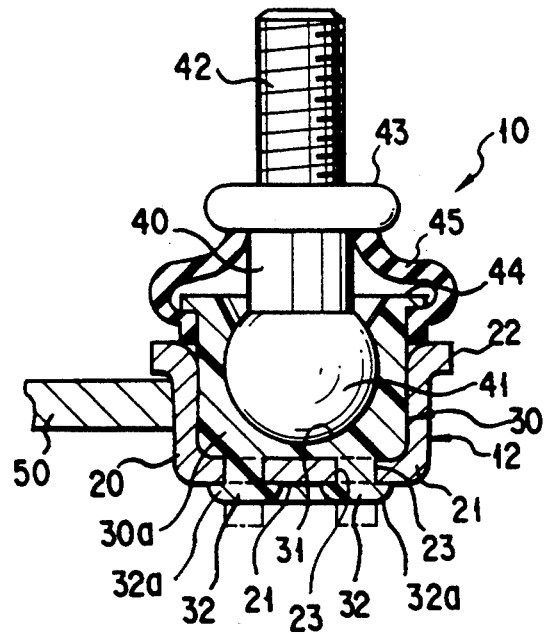
F I G. 7
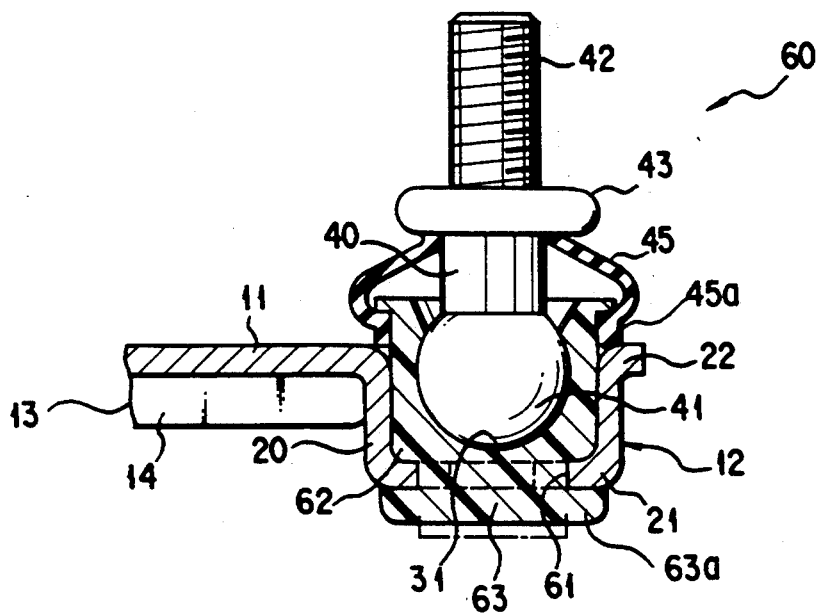
F I G. 8

BALL JOINT APPARATUS AND A MANUFACTURING METHOD THEREFOR

BACKGROUND OF THE INVENTION

1. Field of the Invention

The present invention relates to a ball joint apparatus used at junctions between mechanical elements of various machines and a manufacturing method therefor, and more particularly, to an improvement of means for fixing a socket to a housing in a ball joint apparatus having the housing and the socket.

2. Description of the Related Art

Various measures have conventionally been proposed to facilitate low-cost manufacture of ball joint apparatuses. In a connecting rod of a stabilizer for motor vehicle suspension described in Jpn. UM Appln. KOKAI Publication No. 61-176011 (Prior Art 1), for example, a circular projection for use as a housing is formed at an end portion of a metal-sheet rod body by burring or flanging. A socket is fitted into this projection. The socket has a concave spherical surface, which receives a spherical head of a stud ball. According to this prior art, the rod body and the housing can be integrally formed from one metal sheet.

In order to prevent the socket from easily slipping out of the housing, the socket, which should have an outside diameter larger than the inside diameter of the housing, must be press-fitted into the housing under a great load in the axial direction thereof. If the socket is press-fitted into the housing with too great a force, however, the spherical head of the stud ball, mated with the concave spherical surface of the socket, cannot rotate smoothly. It has been difficult, therefore, to press-fit into and fix the socket to the housing in a manner such that smooth operation of the stud ball is compatible with the practical strength of the socket in order to resist disengagement.

To secure the socket in place, an adhesive may be used. It is difficult, however, to secure the socket firmly with any adhesive available, since the material of the socket, i.e., engineering plastic which has mechanical properties suitable for sockets, is resistant to most chemicals and is hardly soluble in solvents. If the housing is made of iron to reduce the cost of the housing, its inner surfaces must be painted, and the paint film on the inner surfaces may decrease the adhesion of the socket to the housing.

In a pillow ball seat described in Jpn. UM Appln. KOKAI Publication No. 2-120209 (Prior Art 2), moreover, a ball seat member (socket) is inserted into a cylindrical piece for use as a housing. According to this prior art, a cap is bonded to that end face of the ball seat member which projects outside the cylindrical piece after the ball seat member is inserted into the cylindrical piece. The cap serves to prevent the ball seat member from slipping out of the cylindrical piece. In this prior art arrangement, however, the cap adds to the number of components of the ball joint apparatus, thus entailing an increase in cost. Further, the cap cannot prevent the ball seat member and the cylindrical piece from rotating relatively to each other.

The socket may possibly be fixed to the cylindrical housing by any other means than the arrangements of Prior Arts 1 and 2. Even in this case, however, the socket sometimes may move in the axial direction of the housing or rotate relatively to the housing, urged by loads in various directions which act on the housing and the stud ball during actual use of the ball joint apparatus. In some cases, this results in deformation or wear of the socket, so that the ball joint apparatus fails to maintain its desired characteristics.

In order to prevent the relative rotation of the housing and the socket, moreover, an arrangement may be proposed such that the inner peripheral portion of the housing and the outer peripheral portion of the socket are formed having a noncircular profile, whereby the socket can be fitted in the housing. In this case, however, a steel sheet or pipe for use as the material of the housing must be worked into a noncircular profile, so that manufacture requires a great deal of labor and also entails higher cost.

SUMMARY OF THE INVENTION

Accordingly, the object of the present invention is to provide a ball joint apparatus, which is of simple construction, using a reduced number of components and in which a housing and a socket can be securely fixed to each other.

According to the present invention, a high strength against a load acting in the direction for relative rotation of the housing and the socket and a load acting in the axial direction of the socket can be obtained. Further, the housing and the socket can be worked with ease, and the number of components cannot be increased, so that a ball joint apparatus can be manufactured at lower cost.

According to the present invention, there is provided a ball joint apparatus which comprises a stud ball having a spherical head, a socket having a concave spherical surface for receiving the spherical head for rotation, and a housing containing the socket.

The housing includes a socket receiving portion, formed of a metal material and having an inner surface with a circular profile, and a bottom wall portion at the bottom of the socket receiving portion, the bottom wall portion having at least one through hole.

The socket is formed of a thermoplastic synthetic resin, and has a projection on the base thereof, in a position corresponding to the through hole. The projection is inserted into the through hole in a manner such that an end portion of the projection projecting outside the through hole is transformed so as not to be able to slip out of the through hole.

In assembling the ball joint apparatus, the socket, previously fitted with the spherical head of the stud ball, is inserted into the socket receiving portion of the housing, and the projection of the socket is inserted into the through hole in the bottom wall portion of the housing. Thereafter, the end portion of the projection, projecting outside the through hole, is heated to a softening point by means of a heater or by an infrared-ray heater, and is then transformed.

BRIEF DESCRIPTION OF THE DRAWINGS

FIG. 6 is a sectional view of the ball joint apparatus, showing modified projections;

FIG. 7 is a sectional view of the ball joint apparatus, showing a modification of the rod member;

FIG. 8 is a sectional view of a ball joint apparatus according to another embodiment of the present invention;

DETAILED DESCRIPTION OF THE PREFERRED EMBODIMENTS

Figure 3:
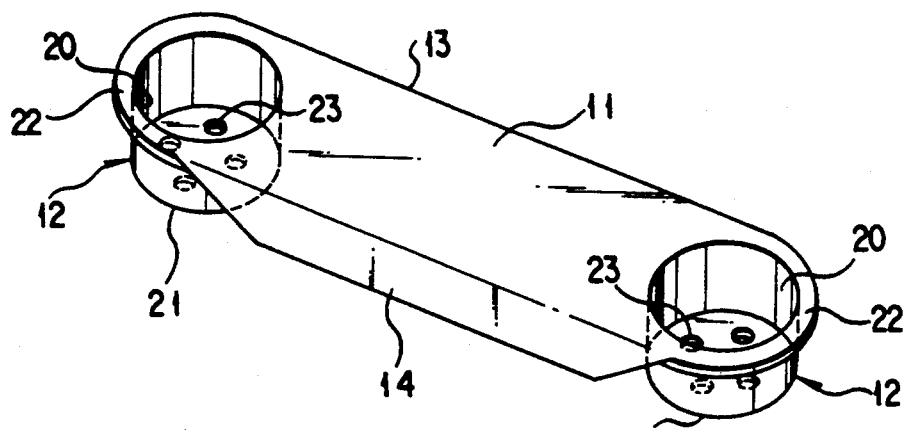
FIG. 3 is a perspective view of a rod member of the ball joint apparatus shown in FIG. 1.

A first embodiment of the present invention will now be described with reference to the drawings of FIGS. 1 to 4. A ball joint apparatus 10 shown in FIG. 1 comprises a metallic rod member 11 and housings 12 attached individually to two opposite end portions of the member 11. As shown in FIG. 3 and other drawings, the rod member 11 and the housings 12 constitute a press-molded piece which is formed of one metal sheet 13 such as a steel sheet. A bent edge portion 14 is formed on each side portion of the rod member 11.

Each housing 12 includes a cylindrical socket receiving portion 20 formed by drawing and a bottom wall portion 21, at the bottom of the receiving portion 20. A flange 22 is formed along an opening edge of the socket receiving portion 20. The bottom wall portion 21 and the flange 22 makes the housing 12 less easily deformable. Even though the housing 12 is formed of a relatively thin metal sheet, it can exhibit a high strength against diametrical load. A plurality of through holes 23 are bored through the bottom wall portion 21. At each portion of the metal rod, a socket receiving portion and a bottom wall having an inner surface with a circular profile may be formed by means of forging, instead of drawing. Alternatively, the housing 12 may be formed by either casting or sintering.

A socket 30 is housed in the socket receiving portion 20. A body 30a of the socket 30 has a concave spherical surface 31. The socket 30 is formed of a thermoplastic synthetic resin, such as polyacetal, polybutylene terephthalate, polycarbonate, polyamide, acrylonitrile butadien sthylene, acrylonitrile stylene acrylate, stylene acrylonitrile, polyethylene, polymethyl methacrylate, polypropylene, polyethylene terephthalate, polystyrene, polyvinyl chloride, polyphenylene sulfide, polysulfone, polyimide, or polyamideimide. The socket 30 is an integral molded piece formed by injection molding. The outside diameter of the socket 30 is a little larger (for example, by about 0.2 mm) than the inside diameter of the socket receiving portion 20. The socket 30 is press-fitted in the receiving portion 20.

Figure 1:
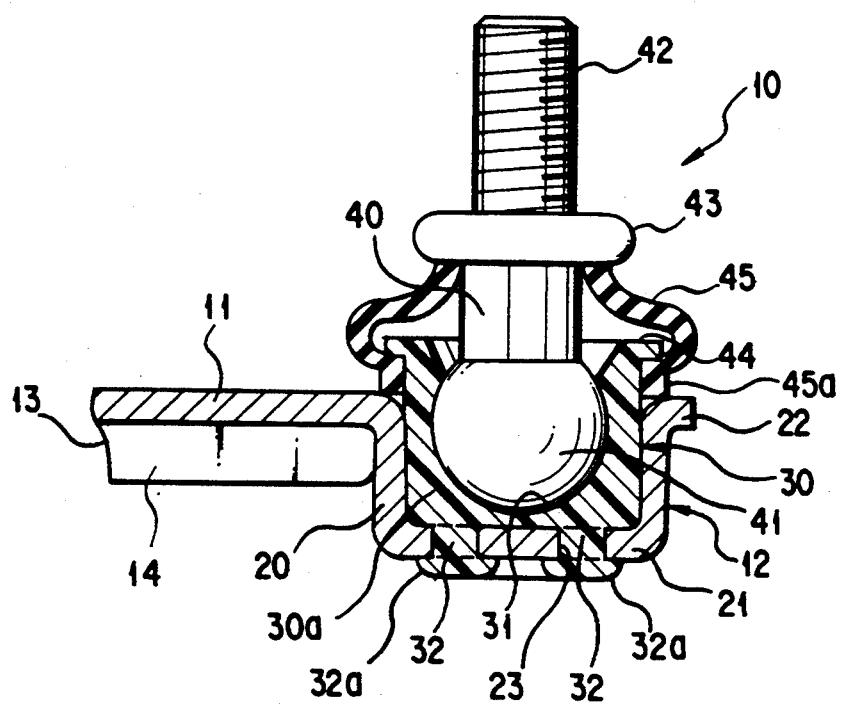
FIG. 1 is a sectional view of a ball joint apparatus according to one embodiment of the present invention.
Figure 2:
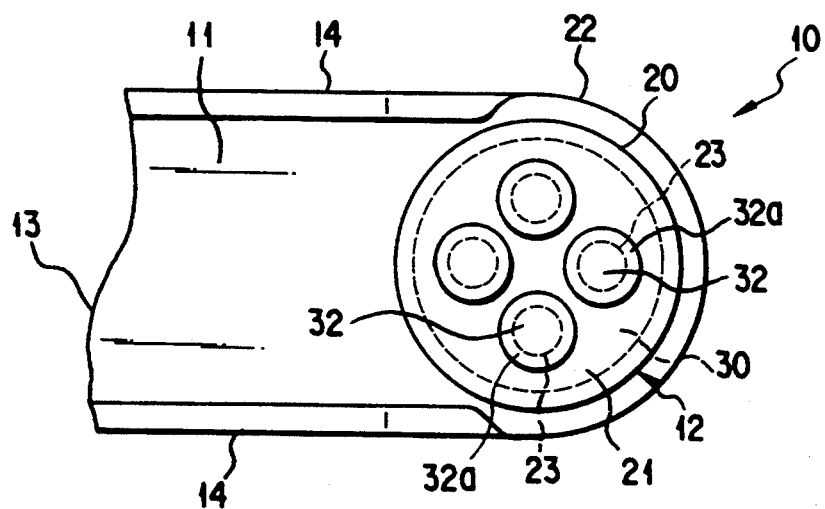
FIG. 2 is a bottom view of the ball joint apparatus shown in FIG. 1.
Figure 4:
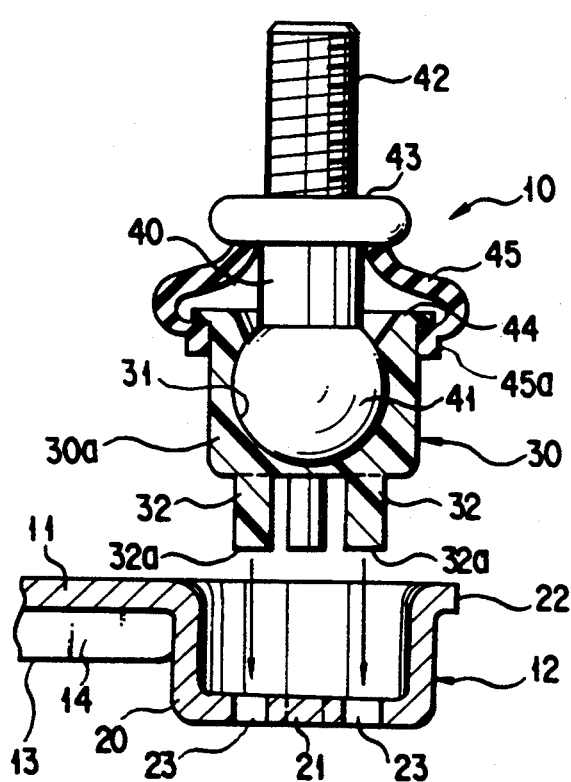
FIG. 4 is a sectional view showing a state before a socket is inserted into a housing of the ball joint apparatus of FIG. 1.

As shown in FIG. 4, a plurality of projections 32 are formed on the base of the socket 30, in positions corresponding individually to the through holes 23. After the projections 32 are inserted into their corresponding holes 23, the respective distal end portions of the projections 32, i.e.; end portions 32a projecting below the holes 23; are softened by means of a heater, an infrared-ray heater, or high-frequency induction heating device (not shown). After the end portions 32a are softened, they are transformed into a shape such that they cannot slip out of the through holes 23, as shown in FIG. 1. The projections 32 become as hard as they were before, as they cool after the transformation.

A spherical head 41, of a stud ball 40, is rotatably fitted in the socket 30 so as to mate with the concave spherical surface 31 thereof. The head 41 is press-fitted into the socket 30 before the socket is inserted into the housing 12. The press-fitting is possible if the socket 30 is made of synthetic resin which has an appropriate elasticity. The stud ball 40 includes a screw portion 42 and a large-diameter portion 43. A deformable dust cover 45 made of rubber or soft synthetic resin is provided between the large-diameter portion 43 and a collar portion 44 of the socket 30. The dust cover 45 is fixed to the housing 12 when its edge 45a is clamped between the collar portion 44 of the socket 30 and the flange 22 of the housing 12 as the socket 30 is inserted into the housing 12.

When the ball joint apparatus 10 is subjected to a torque in a direction such that the housing 12 and the socket 30 are rotated relative to each other, the relative rotation of these members is prevented by a frictional resistance between them and a shearing resistance of the projections 32. As for a load acting in the axial direction of the stud ball 40, it can be prevented from causing the socket 30 to slip out of the housing 12 by the frictional resistance between the housing 12, the socket 30 and the fixed engagement of the projections 32 with the bottom wall portion 21. Thus, the socket 30 can be prevented from being loosened in the housing 12 or from being worn away or deformed. Although a load may act to pull the stud ball 40 from the socket 30, the stud ball 40 would not be pulled since the flange 22 prevents the opening of the socket 30 from being deformed.

The through holes 23 can be easily formed by stamping out parts of the bottom wall portion 21 as the housing 12 is being formed by drawing. The projections 32 can be easily formed by integral molding with the socket body 30a as the socket 30 is formed by injection molding. Thus, there is no substantial increase in the number of components and labor time consumption.

Figure 5:
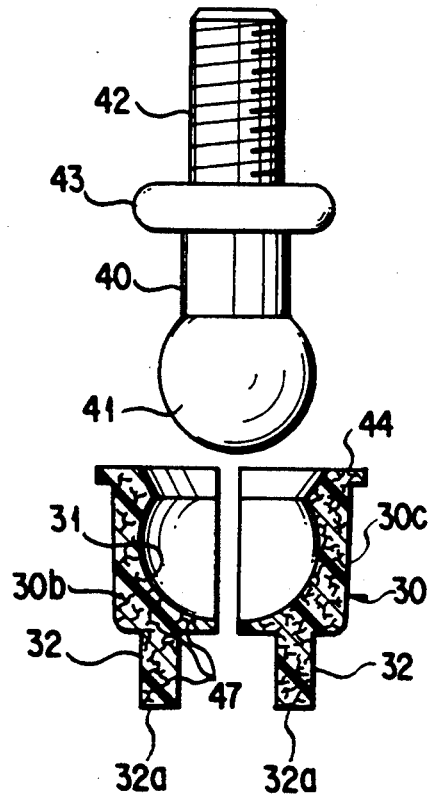
FIG. 5 is a sectional view showing a modification of the socket.

As shown in FIG. 5, FRP (fiber-reinforced plastic) mixed with a large number of short glass fibers 47 may be used as the resin material for the socket 30. Nylon (polyamide) is an example of this resin. In this case, the socket 30 is composed of a plurality of socket component pieces 30b and 30c divided in the diametrical direction so that the spherical head 41 can be fitted on the concave spherical surface 31. Since the socket 30 is reinforced with the short glass fibers 47, it enhances the strength of the projections 32.

The respective end portions 32a of the projections 32, which project below the bottom wall portion 21, may be transformed in a manner such that they are continuous with one another, as shown in FIG. 6. In so doing, the strength of the socket 30 to resist disengagement from the housing 12 can be further increased. As shown in FIG. 7, moreover, the metallic housing 12 and a metallic rod member. 50 formed separately from the housing may be fixed to each other by a suitable fixing method, such as welding. Further, the screw portion may be provided on one end side of the rod member 50, and the housing 12 on the other end side. Furthermore, the housing 12 may be arranged in a desired direction at each end of the rod member 50.

Figure 9:
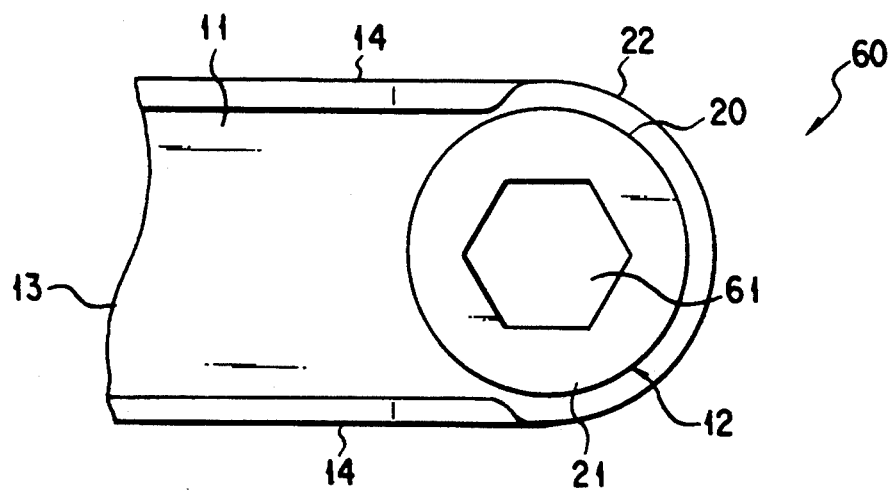
FIG. 9 is a bottom view of a housing of the ball joint apparatus shown in FIG. 8.
Figure 10:
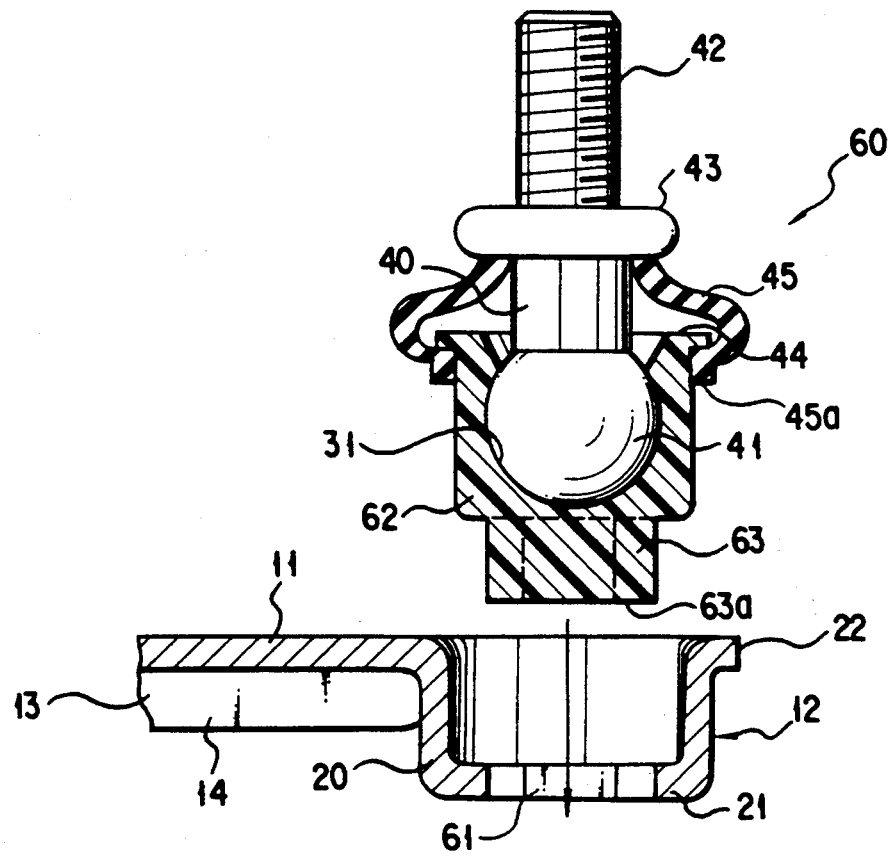
FIG. 10 is a sectional view showing a state before a socket is inserted into the housing of the ball joint apparatus of FIG. 8.

FIGS. 8, 9 and 10 show another embodiment of the present invention. In a ball joint apparatus 60 according to this embodiment, as shown in FIG. 9, a non-circular (e.g., hexagonal) through hole 61 is bored through a bottom wall portion 21 of a housing 12. As shown in FIG. 10, a projection 63, corresponding in shape to the hole 61, is provided on the base of a socket 62. After the socket 62 and the projection 63 are press-fitted or inserted into the housing 12 and the through hole 61, respectively, a lower end portion 63a of the projection 63 is softened by heating or the like. Thereafter, the end portion 63a is transformed in the manner shown in FIG. 8. Also in this case, a rod member 11 and the housing 12 may be formed separately from each other. Further, the through hole 61 and the projection 63 may be in the shape of some other polygon, such as a quadrangle. If the hole 61 and the projection 63 are circular in shape, the hole 61 is situated in a position eccentric to the housing 12. The socket 62 and the housing 12 are thereby prevented from rotating relative to each other.

What is claimed is:

1. A ball joint apparatus comprising:
   a stud ball having a spherical head;
   a socket having a concave spherical surface for receiving the spherical head for rotation; and
   a housing containing the socket;
   the housing including a socket receiving portion formed of a metal material and having an inner surface with a circular profile and a bottom, a bottom wall portion at the bottom of the socket receiving portion, the bottom wall portion having a plurality of small circular through holes therein; and
   the socket being formed of a thermoplastic synthetic resin and having a base and projections on the base thereof, said projections being at positions corresponding to said small circular through holes, said projections being inserted into respective ones of said through holes, and said projections having end portions projecting outside said through holes, and wherein said projecting end portions of said projections are transformed so as not to be able to slip out of said through holes.

2. A ball joint apparatus according to claim 1, wherein the socket receiving portion of said housing is further comprises a flange at an opening thereof.

3. A ball joint apparatus according to claim 1, wherein said socket is formed of a fiber-reinforced plastic obtained by reinforcing a synthetic resin with short glass fibers.

4. A ball joint apparatus according to claim 3, wherein said socket has a diametrical direction and comprises a plurality of socket component pieces divided in the diametrical direction thereof.

5. A ball joint apparatus according to claim 1, wherein a plurality of said projections are arranged so that end portions of the projections which project outside the through holes are transformed to be continuous with one another.

6. A ball joint apparatus comprising:
   a stud ball having a spherical head;
   a socket having a concave spherical surface for receiving the spherical head for rotation; and
   a housing containing the socket;
   the housing including a socket receiving portion formed of a metal material and having an inner surface with a circular profile and a bottom, a bottom wall portion at the bottom of the socket receiving portion, the bottom wall portion having one non-circular through hole therein, and
   the socket being formed of a thermoplastic synthetic resin and having a base and a projection on the base thereof, said projection being at a position corresponding to said non-circular through hole, said projection being inserted into said through hole, and said projection having an end portion projecting outside said through hole, and wherein said projecting end portion is transformed so as not to be able to slip out of said through hole.

7. A ball joint apparatus according to claim 6, wherein the socket receiving portion of said housing further comprises a flange at an opening thereof.

8. A ball joint apparatus according to claim 6, wherein said socket is formed of a fiber-reinforced plastic obtained by reinforcing a synthetic resin with short glass fibers.

9. A ball joint apparatus according to claim 6, wherein said socket has a diametrical direction and comprises a plurality of socket component pieces divided in the diametrical direction thereof.

10. A method for manufacturing a ball joint apparatus which includes a stud ball having a spherical head, a socket having a concave spherical surface for receiving the spherical head for rotation, and a housing containing the socket, the method comprising:
    forming the housing, including a socket receiving portion, of a metal material, the socket receiving portion having an inner surface with a circular profile and a bottom wall portion, and forming a plurality of small circular through holes in the bottom wall portion;
    forming projections on the base of the socket, said projections being formed of a thermoplastic synthetic resin, and said projections having respective end portions, said projections being at positions corresponding to said small circular through holes;
    fitting the spherical head of the stud ball into the socket so as to mate with the concave spherical surface thereof;
    inserting the socket and said projections into the socket receiving portion of the housing and said through holes, respectively, such that said end portions of said projections project outside said through holes;
    softening the end portions of said projections projecting outside said through holes; and
    transforming the softened end portions of said projections so that said projections are not able to slip out of said through holes.

11. A method for manufacturing a ball joint apparatus according to claim 10, wherein the socket has a collar portion and the housing has a flange portion, the method further comprising:
    securing dust cover to said housing by clamping an edge of said dust cover between the collar portion of said socket and the flange portion of said housing as said socket is inserted into said housing.

12. A method for manufacturing a ball joint apparatus according to claim 10, wherein said housing is formed by one of drawing, forging, casting, and sintering.

13. A method for manufacturing a ball joint apparatus which includes a stud ball having a spherical head, a socket having a concave spherical surface for receiving the spherical head for rotation, and a housing containing the socket, the method comprising:
    forming the housing, including a socket receiving portion, of a metal material, the socket receiving portion having an inner surface with a circular profile and a bottom wall portion, and forming one non-circular through hole in the bottom wall portion;

forming of a corresponding non-circular projection on the base of the socket at a position corresponding to said non-circular through hole said non-circular projection being formed of a thermoplastic synthetic resin and having an end portion;

fitting the spherical head of the stud ball into the socket so as to mate with the concave spherical surface thereof;

inserting the socket and said projection into the socket receiving portion of the housing and said through hole, respectively, such that said end portion of said projection projects outside said through hole;

softening the end portion of said projection projecting outside said through hole; and transforming the softened end portion of said projection so that said projection is not able to slip out of said through hole.

14. A method for manufacturing a ball joint apparatus according to claim 13, wherein the socket has a collar portion and the housing has a flange portion, the method further comprising:

securing a dust cover to said housing by clamping an edge of said dust cover between the collar portion of said socket and the flange portion of said housing as said socket is inserted into said housing.

15. A method for manufacturing a ball joint apparatus according to claim 13, wherein said housing is formed by one of drawing, forging, casting, and sintering.

* * * * *